United States Patent [19]

Thornton, Jr.

[11] Patent Number: 4,653,925

[45] Date of Patent: Mar. 31, 1987

[54] METHOD AND APPARATUS FOR MEASURING ANY OF A LARGE NUMBER OF CHARACTERISTICS OF LAMPLIGHT

[76] Inventor: William A. Thornton, Jr., 27 Harvard Rd., Cranford, N.J. 07016

[21] Appl. No.: 768,573

[22] Filed: Aug. 23, 1985

[51] Int. Cl.$^4$ ............................................... G01J 3/51
[52] U.S. Cl. ..................................... 356/419; 364/526
[58] Field of Search .................... 356/402, 416, 419; 364/526

[56] References Cited

U.S. PATENT DOCUMENTS 4,176,294 11/1979 Thornton, Jr. et al. ............ 356/406
4,334,782 6/1982 Thornton, Jr. et al. ............ 313/485

Primary Examiner—Vincent P. McGraw

[57] ABSTRACT

Method and apparatus for rapidly measuring any of a large number of characteristics of lamplight. Apparatus extracts from the illumination being measured seven narrow visible bands and one wider band of ultraviolet. The measured power in each of the visible bands is multiplied by a weighting coefficient and the combination of the products provides a number which is indicative of the lamplight characteristic being measured. The measured power in the ultraviolet band is separately weighted from the measurements in the visible bands.

16 Claims, 7 Drawing Figures

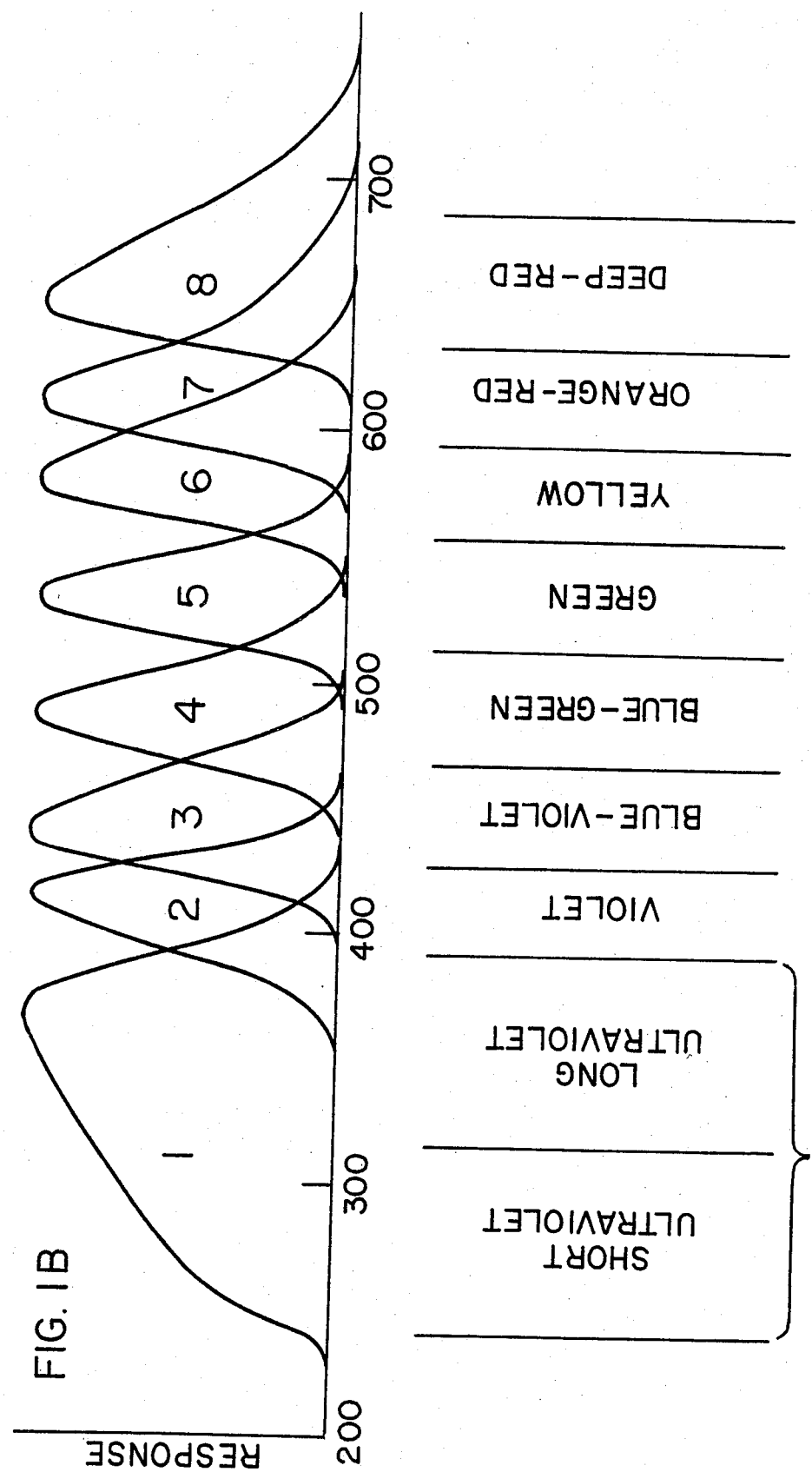

METHOD AND APPARATUS FOR MEASURING ANY OF A LARGE NUMBER OF CHARACTERISTICS OF LAMPLIGHT

BACKGROUND OF THE INVENTION

This invention relates to method and apparatus for measuring any of a large number of characteristics of lamplight and, more particularly, to a method and apparatus for expressing as a number any one of a large number of characteristics of artificial illumination as that characteristic is perceived by the average observer.

Illumination quality and quantity are best judged by consensus, using a group of expert, unbiased, experienced human observers with normal color vision. Given such a group of observers, one can expect to get a reliable evaluation of any aspect of illumination. After all, "illumination" has little meaning except as it relates to human activities, and as judged by human observers.

Is the office lit brightly enough for painstaking paperwork? Does the restaurant illumination make food look appetizing? Does the concert hall enable a patron to read his program and yet highlight the orchestra on the stage? Does the lighting in the hospital room encourage the patient by benefitting his appearance, to his own satisfaction and that of his visitors? Does the hotel lobby lighting yield attractive coloration of guests and decor? Will the draftsman in the proposed engineering complex be able to work long hours without visual fatigue?

A group of expert observers, with time and patience, can answer these questions. The human visual system can make such judgements, and of course helped formulate the questions in the first place. But such an investment in man-hours is seldom possible.

Is there a substitute for the group of human observers, a sort of "secondary standard"? Consider the complete spectral power distribution of the illumination, i.e. the composition of the lamplight, in one of the situations above. A first-class spectroradiometer can determine the spectral content of the lamplight. Once that is accomplished, a first class computer can evaluate the content of the lamplight, and come up with ratings which partially answer many questions like those above.

It is now possible that a portable instrument can do better even than that. What is needed: (1) An optical device simpler than the spectroradiometer, (2) more sophistication in relating the results to what is actually seen, and (3) the same first class computer.

An illumination quality meter would look at the lamplight, but see much of what the human sees when he looks at the illuminated scene. Among other things, the meter should see brightness, footcandles, attractiveness of coloration, color, color-temperature, color rendering index, gamut of coloration, fading risks, color-scheme stability, visibility. It should indicate how many brightness units are equivalent to every footcandle, and to every watt of light; how many visible watts fall on a square meter of work surface. It should indicate how stable color-schemes will be in a proposed illumination. The lamp-user should know exactly what his customers will enjoy about the lighting—and what they will find distasteful.

Among the important qualities of illumination, particularly artificial illumination as supplied by commercial lamplight, are: 1. Brightness, as perceived by the user, and 2. Coloration of the scene, (a) as judged by the trueness of the observed colors, (b) as judged by the pleasantness and satisfaction given by the colors of the surroundings, (c) as judged by how clearly colors are seen. None of these three qualities of illumination has been adequately measured by meters available to the user. The familiar footcandle meter can differ by 100% or more from expert visual judgement of the brightness of a scene, while no good measure at all of visibility was possible. The Color-Rendering Index (CRI), which can be calculated with the use of a full scale computer, is an index of similarity of coloration to that afforded by real phases of daylight; it fails to agree with the observer's assessment of coloration of a scene in all three respects, trueness, pleasantness, and clarity.

Some lighting problems with which a new meter should cope: Assess particularly pleasing and successful lighting installations, to determine which qualities are the important ones in those cases. Assess a problem installation, to determine what qualities are lacking. Assess potential customers' present lighting, to establish a basis on which to make recommendations for improvement. Assess a new lamp, independent of its environment, to predict, before installation, the quality of its illumination. Assess different qualities and quantities of illumination, under which difficult visual tasks (a) are done easily and comfortably, (b) are done with difficulty, or (c) should not be attempted. Assess many lighting environments, to build up a personal correlation between what the user sees and the numerical qualities measured by the meter. Choose lamplight for minimum ultraviolet and violet content per unit of brightness or visibility. Act as a portable monitor, to assure that certain illumination fulfills requirements either as to quality or quality, or both. Act as a portable monitor, with analysis capability unequalled even by the best (portable or stationary) spectroradiometer. Act as a portable monitor, substituting for a group of trained observers at the user's elbow. Act as a portable monitor, substituting for the customer's own visual system. Act as a portable monitor, demonstrating that all requirements in lighting design have been fulfilled. Act as a portable monitor, showing what lighting requirements are still lacking before the installation is turned over to the customer. Indicate which lamplight yields the most visibility per watt of lighting power; how to save the most electrical-power cost; the most energy, in kilowatt-hours or barrels of oil. Indicate how rapidly lamplight may be expected to fade furnishings.

Some places to use the new meter: The kitchen: clarity and appearance of food during preparation need monitoring. The museum, or art gallery: are the precious artifacts adequately visible, but minimally irradiated by harmful wavelengths? The factory: difficult visual tasks can be done with comfort and well-being, if the lamplight is monitored and improved in quality. The postoffice: sorting is the sort of visual task requiring exceptional "seeing". The bank: it has already been demonstrated that banking tasks can be done in visual comfort, with half the electric power, if lamplight quality is sufficiently high. The mill: Aristotle found some little time ago that weavers need special care in their illumination. The buffet: in the home, it is sufficient if the guests find the repast appetizingly colored and attractive; in the commercial restaurant or hotel, it is a matter of economics that the paying diners find the color-rendering of the food array enticing. The restaurant kitchen: crisp clarity of vision helps get the right ingredients in the right bowls. The diagnostic area: in the home, doctor's office, or hospital it is essential that the lamplight render the patient's condition accurately. The beauty parlor: make-up application, hair-coloring, finger nail polish application all require good color-rendering and clarity. The barber shop: rendering of hair and complexions, as well as good-seeing for the barber, are economic requirements. The hotel or motel bathroom: color-rendering of the usual standard fluorescent lamp takes out all the enthusiasm of a new day. Make-up stations, rest rooms, vanity mirrors in hotel and motel rooms: lamplight effects on complexion colors may be the most important of all. The restaurant: color-rendering of both food and patron, and at the same time achieving a subdued lighting-level, is a real art. The laundry (home or professional): how white is white? Without proper color-rendering, it is impossible to tell. The food-processing plant, or cannery: does every bit of material belong in the can? The fabric store: what is the color scheme in the plaid really like? How does a fabric-color really relate to its neighbors?

The usual light meter outputs a single number. Sometimes, but not always, that single number gives the user an accurate measure of how bright a space appears to the average person, or how well one can see in the space, or what camera exposure to use. The meaning of its scale of units must always be carefully and patiently learned. If the meter is a "footcandle meter", experience teaches the user this sort of thing: (1) a reading of 1 footcandle warns that some difficulty probably will be encountered in reading a newspaper; (2) a reading of 50 footcandles is likely to be comfortable; (3) a reading of 500 footcandles will sometimes seem too bright. Not much more than that can be inferred from reading a footcandle meter. The footcandle meter is an inadequate stand-in for human vision, or for the human observer. Even so, its scale of units takes time to understand and use.

The footcandle-meter has a single eye, as does the light-meter on a camera. With a single eye, a light-meter can distinguish lightness and darkness—nothing more. What a single eye senses can be described with a single dimension, like inches on a yardstick.

U.S. Pat. No. 4,334,782 dated June 15, 1982, to Thornton discloses method and apparatus for expressing as a number the relative brightness of artificial illumination as it is perceived by the average observer. There is extracted (i.e., detected) from the illumination to be measured, a blue-appearing narrow band, a green-appearing narrow band, a yellow appearing narrow band; and a red-orange-appearing narrow band. From these extracted bands are generated six different signals related to the watts of energy in each of the four extracted bands. The six signals are combined and expressed as a number which is indicative of the brightness of the artificial illum-ination as perceived by the average observer. This four eyed device agrees better with what the normal human observer sees as "brightness"than does the footcandle-meter described above.

SUMMARY OF THE INVENTION

The method and apparatus of the present invention are embodied in the following device. The device is an eight-eyed light meter comprising a microcomputer and a large software memory to perform its computations. The meter sees, by looking directly at the lamplight, what the human expert sees by looking into the room illuminated by that lamplight. With its eight detectors, the meter can do what the most experienced and highly-trained human observer cannot do: sense all the characteristics of a certain lamplight by merely looking at the lamplight. The human observer needs the usual complex colored scene, illuminated by that lamplight, to assess the many effects of the lamplight on the appearance of the illuminated scene. In this description, the "many effects of the lamplight on the appearance of the illuminated scene", are termed the characteristics of that lamplight.

The human observer can, for example, pronounce the color-attractiveness of the illuminated scene as "good" or "fair" or "poor". He can, by careful comparison of similar adjacent scenes illuminated differently, decide which one of these excels the other in color-attractiveness, if only by a bit. But two difficulties remain: (1) how to put a numerical value—a number—on the color-attractiveness of a certain scene, and (2) how to be sure that the "average person" will assess the color-attractiveness in about the same way.

Much of the value of the new meter resides in the provision of several new scales of the kind alluded to in the preceding paragraph. These new scales (1) are numerical, (2) are representative of assements of lamplight quality by "average persons", and (3) are completely visually—based. The meter measures—puts a NUMBER on—twenty important characteristics of the lamplight, which will be discussed in detail hereinafter.

| | |
|---|---|
| * Brightness | (These five |
| * Color-Attractiveness | are strictly |
| * Visibility | visual |
| * Color-Scheme-Stability | characteristics |
| * Brightness per Footcandle | of lamplight) |
| * Color-Preference Index | |
| * Color-Gamut | |
| * Visibility per Footcandle | |
| * Visible watts per square meter | |
| * Violet watts per square meter | |
| * Ultraviolet watts per square meter | |
| * Visible microwatts per lumen | |
| * Violet microwatts per lumen | |
| * Ultraviolet microwatts per lumen | |
| * Brightness per UV microwatt per sq. meter | |
| * Visibility per UV microwatt per sq. meter | |
| * Footcandles | |
| * Chromaticity x,y | |
| * Color-Temperature | |
| * Color-Rendering Index | |

The eight "eyes" of the composite meter comprise seven narrow band-pass filters which respectively extract from the radiation to be measured seven narrow bands peaked in the violet, blue-violet, blue-green, green, yellow, orange red, and deep-red, and a remaining filter which extracts a broader band in the ultraviolet. Each of the extracted radiations is used to energize a separate photodetector so that a value proportional to the intensity of that extracted radiation can be determined. A problem remains, however, in that not all samples of the selected narrow band pass filters are identical in their performance, and the same applies to the photodetectors. For this reason, each meter has to be calibrated individually.

In order to calibrate each meter, it is necessary to measure, with the meter, at least seven different lamplights of highly disparate emissions; for each of these lamplights, all characteristics are known. For each lamplight, the seven measured contributions of each visible radiation band, together with the known magnitude of a characteristic, form a linear equation with seven unknowns—the seven coefficients for that meter, for that lamplight, and for that characteristic. The seven lamplights yield seven equations, which are then solvable for the seven coefficients, of that characteristic. In practice, the greater the number of known lamplights which are used, the more accurate the calibration of the meter, but at least seven must be used. The number of simultaneous equations is equal to the number of lamplights measured.

In practice it has been found desirable to use eighteen different lamplights of highly disparate emissions, for which each lamplight characteristic desired to be measured is already known. This provides eighteen simultaneous equations with seven "unknowns". With the aid of a computer, the equations are quickly solved, providing accurate weighting coefficients for each of the seven narrow bands for each characteristic desired to be measured. These coefficients are then put into the read-only-memory device.

In practice, when an illumination characteristic is to be computed, the measured power in each of the seven bands is multiplied by its determined band-weighting coefficient to provide a plurality of values, the summation of which is an accurate representation of the lamplight characteristic being computed.

The coefficient for the ultraviolet energy, determined (extracted) by the eighth "eye", can be computed by summing the known ultraviolet powers in the various lamps measured, summing the ultraviolet meter-outputs for the lamps measured, and dividing the former by the latter. The ultraviolet power is not used as a component in the simultaneous equations used to compute the 'visible' characteristics of the lamplight.

Summarizing, the meter is a portable device to sample the illumination in a particular area, and to compute and display a large number of qualities of that illumination. The meter's sensitive detector-head consists of eight photodiodes each covered by a different optical filter, so that each is responsive to a different portion of the spectrum. Thus the signal from each diode represents the intensity of that portion of the spectrum to which it is responsive. The photodiode-filter combinations are arranged in an array and exposed to the illumination which it is desired to analyze.

Each photodiode filter combination generates a signal in response to its portion of the incident light. Each signal is amplified by an operational amplifier, and charges a capacitor. The analog voltage on the capacitor is converted to a number by an analog/digital converter. The eight numbers, representing the eight portions of the incoming light, are stored in the microcomputer memory. Mathematical functions are stored in the read only memory; upon inserting the eight incoming numbers into each of these functions, each function computes a value of a particular characteristic of the incident illumination.

Put the meter in whatever illumination you wish to know more about, touch the 'read' button, and give it a second to sample the light through its eight eyes. By that time it has memorized the eight inputs, and already computed the twenty characteristics of the illumination. Touch more buttons and call out the illumination characteristis one by one to the liquid crystal display, or print them on an included printer.

There is provided a method and apparatus for expressing as a number, not only the brightness of artificial illumination as it is perceived by the average observer, but also a large number of additional characteristics of artificial illumination, each as it is perceived by the average observer. In a preferred embodiment, there is first extracted (i.e., detected) from the illumination to be measured, eight portions of the illumination spectrum which fall within the following radiation bands: a wide band of ultraviolet radiation extending from about 250 nm to about 400 nm, a violet-appearing narrow band having a mean wavelength of from about 400 nm to about 425 nm, a blue-violet-appearing narrow band having a mean wavelength of from about 430 nm to about 470 nm, a blue-green-appearing narrow band having a mean wavelength of from about 470 nm to about 500 nm, a green-appearing narrow band having a mean wavelength of from about 510 nm to about 550 nm, a yellow-appearing narrow band having a mean wavelength of from about 560 nm to about 600 nm, an orange-red-appearing narrow band having a mean wavelength of from about 600 nm to about 630 nm, and a deep-red-appearing narrow band having a mean wavelength of from about 640 nm to about 680 nm. There is generated, from these eight extracted radiation bands, a series of eight signals each of which is proportional to the power in watts resident in the corresponding radiation band in the artificial illumination. Signal UV is proportional to the watts of radiation power in the ultraviolet wide band extracted from the illumination, signal V is proportional to the watts of radiation power in the violet-appearing narrow band extracted from the illumination, signal BV is proportional to the watts of radiation power in the blue-violet-appearing narrow band extracted from the illumination, signal BG is proportional to the watts of radiation power in the blue-green-appearing narrow band extracted from the illumination, signal G is proportional to the watts of radiation power in the green appearing narrow band extracted from the illumination, signal Y is proportional to the watts of radiation power in the yellow-appearing narrow band extracted from the illumination, signal OR is proportional to the watts of radiation power in the orange-red-appearing narrow band extracted from the illumination, and signal DR is proportional to the watts of radiation power in the deep-red-appearing narrow band extracted from the illumination.

In a preferred embodiment, each of twenty characteristics of the illumination has associated with it eight coefficients. In the case of an absolute characteristic (to which may be associated a magnitude) of the illumination, such as brightness, the resulting number indicating the magnitude of the brightness perceived by the average observer is given by:

$$B = uv^*UV + v^*V + bv^*BV + gbg^*BG + g^*G + y^*Y + or^*OR + dr^*DR,$$

where the lower case symbols (uv) represent the coefficients and upper-case the signals. For "brigntness", uv=0 since UV light does not contribute. In the case of a relative characteristic (which is independent of the intensity of the illumination), such as correlated-color-temperature, the resulting number is given by:

$$CCT = (uv^*UV + v^*V + bv^*BV + bg^*BG + g^*G + y^*Y + or^*OR + dr^*DR) \text{ divided by}$$
$$(UV + V + BV + BG + G + Y + OR + DR).$$

For CCT, as well, uv=0. There is also provided an apparatus which will perform these functions.

BRIEF DESCRIPTION OF THE DRAWINGS

For a better understanding of the invention, reference may be had to the preferred embodiment, exemplary of the invention, shown in the accompanying drawings in which:

FIG. 1B is a graph of relative response versus wavelength of each of the eight photodiode-filter-combinations (PFCs) used to extract the eight required portions of the spectrum of the illumination to be measured. Also shown in FIG. 1B are the color-names of the corresponding portions of the spectrum;

DESCRIPTION OF THE PREFERRED EMBODIMENT

For a discussion of the science of lighting and the international standards which have been established, reference should be made to IES Lighting Handbook, 1981 Reference Volume, published by the Illuminating Engineering Society of North America, New York, N.Y., Section 4, "Measurement of Light and Other Radiant Energy", and Section 5, "Color". The present method and apparatus conform to these internationally accepted standards, in order to express as numbers the "Footcandle Level", "Color-Rendering Index", "Color Gamut", "Color-Preference Index", "Correlated Color Temperature", "Chromaticity x,y" (as in FIG. 3), "Visible Microwatts per Lumen", "Violet Microwatts per Lumen", "Ultraviolet Microwatts per Lumen", "Visible Milliwatts per Square Meter", "Violet Milliwatts per Square Meter", and "Ultraviolet Milliwatts per Square Meter". The present method and apparatus also express as numbers the following visually-based characteristics: "Color Attractiveness", "Color-Scheme Stability", "Brightness Units", "Brightness Units per Ultraviolet Milliwatt per Square Meter", "Brightness Units per Footcandle", "Visibility Units", "Visibility Units per UV Milliwatt per Square Meter", and "Visibility Units per Footcandle".

Figure 1A:
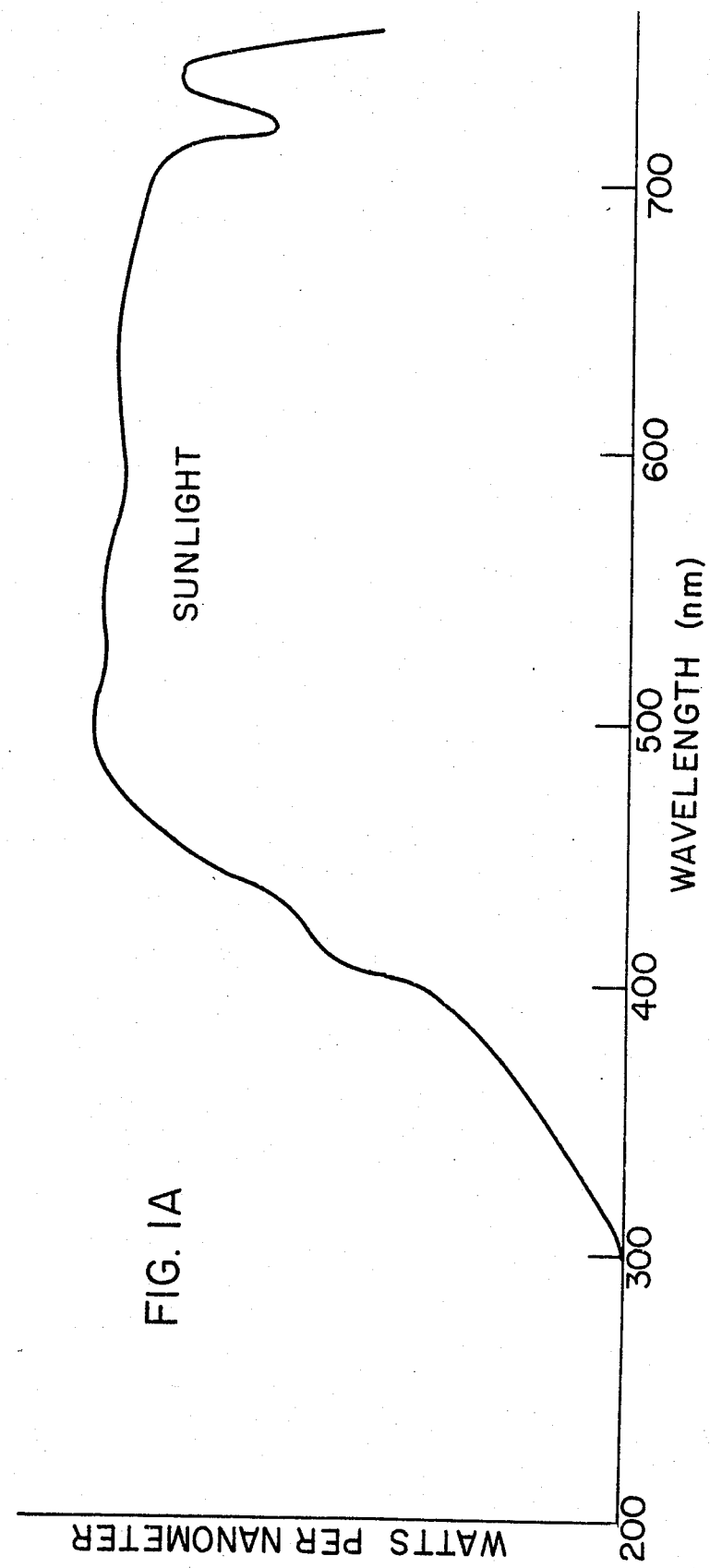
FIG. 1A includes a graph of the spectral power distribution of a typical kind of illumination, namely average sunlight. In that graph, watts per nanometer wavelength interval are plotted against wavelength in nanometers (nm). The ordinate is in relative units, which will depend upon the intensity of sunlight being measured.

In U.S. Pat. No. 4,176,294, dated Nov. 27, 1979, to Thornton, is set forth a suggestion that three peaks of spectral response of the normal human visual system are centered approximately at 450 nm, 540 nm, and 610 nm, see FIG. 3 of the patent. Curves which somewhat correspond to those in the patent, are set forth in FIG. 1B and are identified as no. 3 (blue-violet), no. 5 (green), and no. 7 (orange-red). Of the eight bands used in the present method and apparatus, these three are the most important for human seeing, and have been designated the "prime-colors". Four additional visible bands, which are less important, even relatively useless, and in some cases detrimental to human seeing, are no. 2 (violet), no. 4 (blue-green), no. 6 (yellow), and no. 8 (deep-red). In order that the present method and apparatus may substitute for the normal human visual system, it is necessary that the spectral position and breadth of the seven visible bands be designated in this way. The remaining band is no. 1, the ultraviolet, not directly related to seeing, but important for its evoking of fluorescence in many perceived objects, and for its biological hazards. Note that the spectral power distribution (spectral composition) of average sunlight, shown in FIG. 1A, contains generous portions of all of the seven visible bands, and also some ultraviolet radiation.

While the seven extracted visible radiation bands preferably have individual peaks which occur at about 410, 450, 490, 530, 580, 610, and 660 nm, the mean wavelength of these bands can respectively vary from about 400 nm to about 420 nm, from about 440 nm to about 470 nm, from about 480 nm to about 500 nm, from about 510 nm to about 550 nm, from about 570 nm to about 595 nm, from about 600 nm to about 625 nm, and from about 640 nm to about 680 nm. In addition, the half width of the narrow extracted bands can vary from about 30 nm to about 55 nm when measured at a radiation intensity which is about 50% of the maximum measured radiation intensity thereof.

In accordance with the present method, the above seven spectral responses are used as weighting functions on the spectral power distribution (SPD) of the illumination. For computing purposes, for example, the product of the blue-violet response (no. 3 of FIG. 1B) and the SPD of the illumination yields a number proportional to the power content of the illumination in the blue-violet band, designated BV.

The above computation is performed for each of the eight responses, for a large number of illuminations (lamplights). Table I lists eighteen lamplights.

TABLE I

1. Warm White standard fluorescent.
2. Cool White standard fluorescent.
3. Daylight standard fluorescent.
4. 3000° K. Prime-color fluorescent (three-component phosphor blend: blue-violet+green+orange-red).
5. 4000° K. Prime-color fluorescent (three-component phosphor blend: blue-violet+green+orange-red).
6. 5000° K. Prime-color fluorescent (three-component phosphor blend: blue-violet+green+orange-red).
7. Cool White Deluxe fluorescent.
8. 4000° K. Anti-prime-color fluorescent (four-component phosphor blend: violet+blue-green +yellow+-deep-red).
9. 200W quartz-tungsten lamp; 3150° K.
10. 200W clear soft-glass incandescent; 2850° K.
11. Same plus Wratten filter combination; 4000° K.
12. Same plus Wratten filter combination; 5500° K.
13. Same plus Wratten filter combination; 6500° K.
14. Gold fluorescent.
15. SCAP fluorescent (strontium chlorapatite:Eu phosphor).
16. ZS fluorescent (zinc silicate:Mn phosphor).
17. YOE fluorescent (yttrium oxide:Eu phosphor).
18. Match fluorescent (violet+deep-red phosphors).

The spectral power distribution (SPD) of each of the above lamplights is multiplied by each of the eight responses, yielding an 8×18 array of numbers representing the signals UV, V, BV, BG, G, Y, OR, and DR for each lamplight.

Chromaticity x is chosen as characteristic no. 1, and used in a sample computation:

Chromaticity of a given lamplight is a relative characteristic (one which is independent of the intensity of the illumination). Chromaticity is a 'visible' characteristic of lamplight, and does not depend on the ultraviolet content of the lamplight. Therefore, chromaticity x is given by the quantity $$(v^*V + bv^*BV + bg^*BG + g^*G + y^*Y + or^*OR + dr^*DR) \quad (A)$$

divided by the quantity $$(V + BV + BG + G + Y + OR + DR), \quad (B)$$

where the lower-case symbols are coefficients and the upper-case symbols are the signals.

TABLE II

| Lamp | Set of 18 simultaneous equations for chromaticity x, characteristic no. 1 | x-value |
|---|---|---|
| 1 WW: | $\frac{v1(2080) + bv1(5988) + bg1(2113) + g1(10485) + y1(28901) + or1(10534) + dr1(12238)}{2080 + 5988 + 2113 + 10485 + 28901 + 10534 + 12238}$ | = 432 |
| 2 CW: | $\frac{v1(3019) + bv1(9715) + bg1(4537) + g1(12631) + y1(25132) + or1(8322) + dr1(9633)}{3019 + 9715 + 4537 + 12631 + 25132 + 8322 + 9633}$ | = 366 |
| 3 DAY: | $\frac{v1(3683) + bv1(12434) + bg1(6438) + g1(12304) + y1(18317) + or1(5816) + dr1(7372)}{3683 + 12434 + 6438 + 12304 + 18317 + 5816 + 7372}$ | = 300 |
| 4 3000U: | $\frac{v1(1638) + bv1(4660) + bg1(2099) + g1(13352) + y1(17334) + or1(15990) + dr1(7650)}{1638 + 4660 + 2099 + 13352 + 17334 + 15990 + 7650}$ | = 451 |
| 5 4000U: | $\frac{v1(2421) + bv1(8519) + bg1(2395) + g1(13123) + y1(13794) + or1(11730) + dr1(5807)}{2421 + 8519 + 2395 + 13123 + 13794 + 11730 + 5807}$ | = 379 |
| 6 5000U: | $\frac{v1(2908) + bv1(10583) + bg1(3239) + g1(17726) + y1(14745) + or1(11402) + dr1(5684)}{2908 + 10583 + 3239 + 17726 + 14745 + 11402 + 5684}$ | = 341 |
| 7 CWX: | $\frac{v1(2257) + bv1(7020) + bg1(3980) + g1(9534) + y1(15695) + or1(8175) + dr1(21560)}{2257 + 7020 + 3980 + 9534 + 15695 + 8175 + 21560}$ | = 370 |
| 8 APC: | $\frac{v1(1597) + bv1(6274) + bg1(5111) + g1(3690) + y1(30997) + or1(819) + dr1(3482)}{1597 + 6274 + 5111 + 3690 + 30997 + 819 + 3482}$ | = 360 |
| 9 QT: | $\frac{v1(47331) + bv1(68721) + bg1(73272) + g1(105585) + y1(185685) + or1(133802) + dr1(379723)}{47331 + 68721 + 73272 + 105585 + 185685 + 133802 + 379723}$ | = 423 |
| 10 SGT: | $\frac{v1(31638) + bv1(39830) + bg1(44914) + g1(60451) + y1(107908) + or1(83049) + dr1(232886)}{31638 + 39830 + 44914 + 60451 + 107908 + 83409 + 232886}$ | = 447 |
| 11 40K: | $\frac{v1(29758) + bv1(35442) + bg1(39455) + g1(44805) + y1(64198) + or1(53164) + dr1(133802)}{29758 + 35442 + 39455 + 44805 + 64198 + 53164 + 133802}$ | = 383 |
| 12 55K: | $\frac{v1(28763) + bv1(34042) + bg1(35862) + g1(37501) + y1(50244) + or1(41870) + dr1(73267)}{28763 + 34042 + 35862 + 37501 + 50244 + 41870 + 73267}$ | = 334 |
| 13 65K: | $\frac{v1(26030) + bv1(29399) + bg1(31236) + g1(31543) + y1(40424) + or1(35217) + dr1(61208)}{26030 + 29399 + 31236 + 31543 + 40424 + 35217 + 61208}$ | = 310 |
| 14 GOLD: | $\frac{v1(114) + bv1(113) + bg1(163) + g1(6372) + y1(22609) + or1(8453) + dr1(9862)}{114 + 113 + 163 + 6372 + 22609 + 8453 + 9862}$ | = 518 |
| 15 SCAP: | $\frac{v1(10495) + bv1(51492) + bg1(4168) + g1(1850) + y1(1001) + or1(209) + dr1(388)}{10495 + 51492 + 4168 + 1850 + 1001 + 209 + 388}$ | = 156 |
| 16 ZS: | $\frac{v1(933) + bv1(2252) + bg1(4094) + g1(26017) + y1(8003) + or1(880) + dr1(803)}{933 + 2252 + 4094 + 26017 + 8003 + 880 + 803}$ | = 239 |
| 17 YOE: | $\frac{v1(1304) + bv1(3104) + bg1(152) + g1(2162) + y1(23166) + or1(26836) + dr1(12402)}{1304 + 3104 + 152 + 2162 + 23166 + 26836 + 12402}$ | = 598 |
| 18 MATCH: | $\frac{v1(3728) + bv1(6262) + bg1(286) + g1(1691) + y1(3008) + or1(5052) + dr1(36026)}{3728 + 6262 + 286 + 1691 + 3008 + 5052 + 36026}$ | = 355 |

Resulting coefficients:
    $v1 = 0.214$    $g1 = 0.0263$
    $bv1 = -0.0624$    $y1 = 0.0511$
    $bg1 = -0.0123$    $or1 = 0.0772$
    $g1 = 0.0263$    $dr1 = 0.0421$ Sample computation for lamplight WW:
.214(2080) − .0624(5988) − .0123(2113) + .0263(10485) + .0511(28901) + .0772 (10534) + .0421(12238) =
445 − 374 − 26 + 276 + 1477 + 813 + 515 = 3126.
Sum of seven signals: 2080 + 5988 + 2113 + 10485 + 28901 + 10534 + 12238 = 72339.

$$\frac{3126 \times 10000}{72339} = .432.$$

In this Table,
3000U = 3000K Prime-color fluorescent lamp    APC = 4000K Anti-prime-color fluorescent lamp
4000U = 4000K Prime-color fluorescent lamp    QT = 200W Quartz-tungsten lamp
5000U = 5000K Prime-color fluorescent lamp    SGT = 200W clear soft-glass incandescent lamp.

In its preferred form, the present method and apparatus combine a plurality of values (the products of the band-weighting coefficients and the measured powers) into a displayed summation which is an accurate TABLE II-continued representation of the lamplight characteristic being measured. This summation is one of the simplest of algorithms. More complex predetermined algorithms can be utilized for special conditions of measurement. As one specific example, instead of summation of the seven terms, the algorithm may include a division, as $$\text{characteristic C} = \frac{v1(2080) + bv1(5988) + bg1(2113) + g1(10485)}{y1(28901) + or1(10534) + dr1(12238)}.$$

A set of simultaneous equations is set up with expressions (A) and (B) for each of the eighteen lamplights (see Table II), using the known values of chromaticity x for each lamplight. In Table II the long integers are the 'signals', and the right-hand values are chromaticity for each lamplight, multiplied by 1000 for convenience. The overdetermined set of simultaneous equations is solved for the seven coefficients v1, bv1, bg1, g1, y1, or1, dr1 for lamplight characteristic "chromaticity x". A sample computation is shown in Table II.

Referring to Table II, each of the seven narrow-band-pass filters is subject to some variation in its transmission, as is each photodiode, used to measure the power in the extracted radiation. Each instrument must be carefully calibrated prior to use, to eliminate the filter-photodiode variations. Thereafter, when measuring a characteristic of an unknown lamplight, the measured power in each of the narrow bands, which is extracted from the lamplight being measured, is multiplied by the previously-computed and previously-assigned band-weighting coefficient to provide a plurality of values, the summation of which is an accurate representation of the lamplight characteristic predetermined to be measured.

Referring again to Table II, in this case the instrument is being calibrated for "chromaticity x", and a similar procedure is followed for each other lamplight characteristic for which the instrument is desired to be calibrated.

In the event the lamplight characteristic is a relative one such as chromaticity x, then the summation of the seven values (coefficient x power) obtained is divided by the summation of the powers in the seven bands, to provide a relative value.

As an example, absolute characteristics include footcandles, brightness units and visibility units. Relative characteristics include chromaticity x, chromaticity y, color-attractiveness and color-gamut. Both "absolute" and "relative" characteristics will be explained more fully hereinafter.

SUMMARY OF OPERATION OF A PREFERRED EMBODIMENT

A preferred embodiment of the apparatus, called the Illumination Quality meter, or IQ meter for short, consists of eight photodiodes each covered by a different optical filter, so as to be responsive to a different portion of the visible spectrum of light; i.e. eight photodiode-filter combinations (PFCs). The signal from each diode represents the intensity of that portion of the visible spectrum to which it is responsive. The photodiode-filter combinations PFC are arranged in an array and exposed to the illumination which it is desired to analyze.

Each PFC generates a signal in response to its portion of the incident light. Each signal is amplified by an operational amplifier, and charges a capacitor. The analog voltage on the capacitor is converted to a digit by an analog/digital converter. The eight digits, representing the eight portions of the incoming light, are stored in a microcomputer memory. An array of 8×20 coefficients, one set of eight for each of the twenty functions (lamplight characteristics), is stored in a read-only memory (ROM). Upon pairing the eight incoming integers (signals) with the eight coefficients of the desired function, and summing the terms, the appropriate value of the desired lamplight characteristic appears at the output of the meter.

DETAILS OF THE OPTICAL INPUTS

A set of Kodak Wratten filters is used for the seven diodes covering the visible region, and a black cobalt glass for the ultraviolet-sensitive photodiode.

Figure 6:
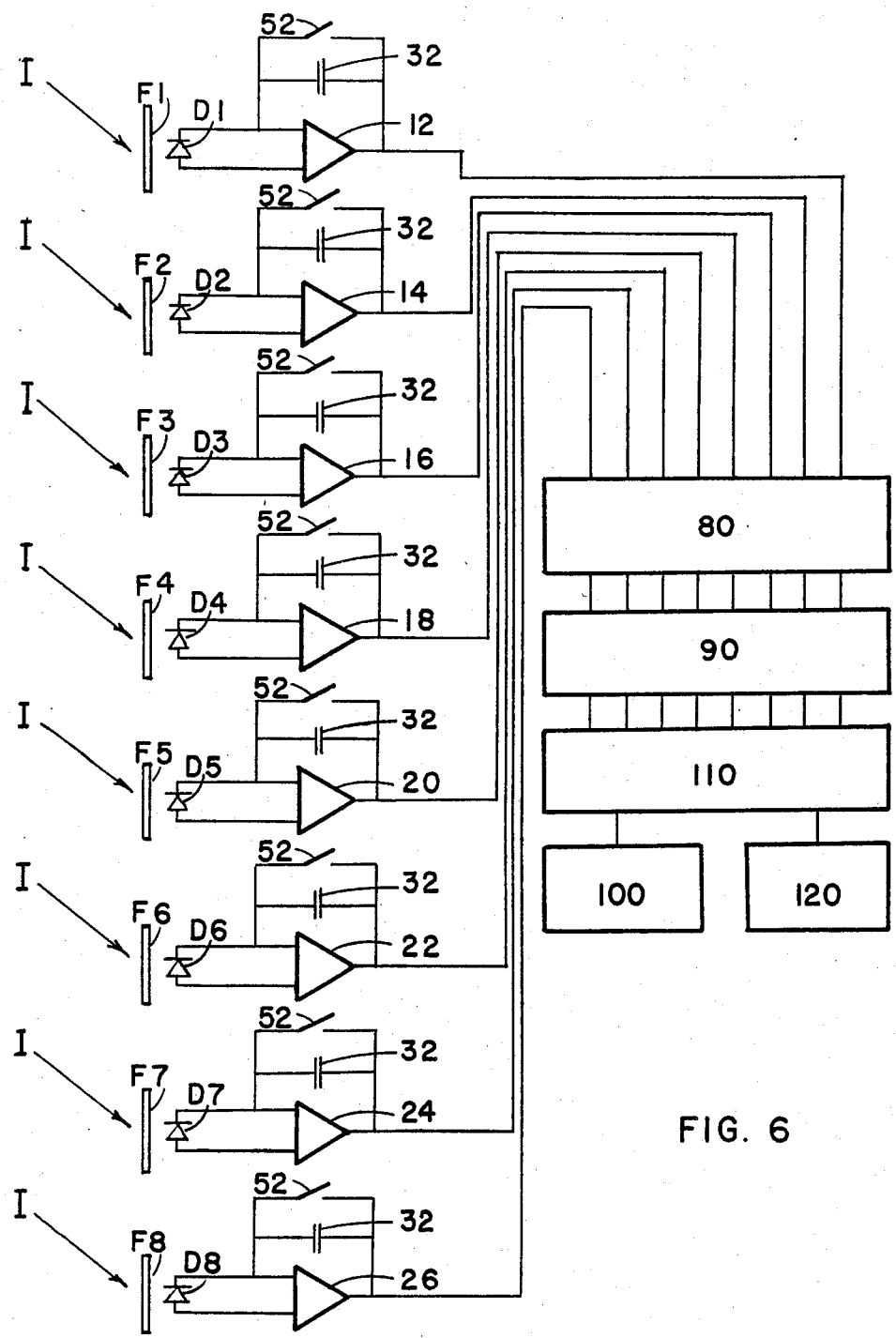
FIG. 6 is a schematic diagram of a preferred embodiment of the present meter.

Referring to FIG. 6, filter F1 is placed over photodiode D1 to form PFC1, which then responds only to ultraviolet light. Filter F2 is placed over photodiode D2 to form PFC2, which then responds only to violet light. Filter F3 is placed over photodiode D3 to form PFC3, which then responds only to blue-violet light, etc.

A schematic diagram of a light meter designed in accordance with the present invention is shown in FIG. 6. The illumination to be measured is designated "I" and impinges on the individual filters designated "F1" to "F8". As a specific example, filter "F5" (green-transmitting) has a maximum of transmission at about 530 nm and a half width of about 40 nm. The spectral transmission of the filter, together with the spectral response of the photodiode behind the filter, serve to sample, from the illumination to be measured, the portion of the illumination spectrum which falls within the indicated green-appearing narrow band.

Eight different photodiode means D1–D8 are actuated respectively by the ultraviolet radiations, the violet-appearing radiations, the blue-violet-appearing radiations, the blue green-appearing radiations, the green-appearing radiations, the yellow appearing radiations, the orange-red-appearing radiations, and the deep-red appearing radiations, in order to generate individual output electrical signals which are proportional to the watts of power in each of the different radiation bands.

A first operational amplifier means 12 has its input connected to the output of the photodiode means D1 which senses the ultraviolet band and generates an amplified output electrical signal which is representative of the desired signal UV.

A second operational amplifier means 14 has its input connected to the output of the photodiode means D2 which senses the violet-appearing band and generates an amplified output electrical signal which is representative of the desired signal V.

A third operational amplifier means 16 has its input connected to the output of the photodiode means D3 which senses the blue-violet appearing band and generates an amplified output electrical signal which is representative of the desired signal BV.

A fourth operational amplifier means 18 has its input connected to the output of the photodiode means D4 which senses the blue-green-appearing band and generates an amplified output electrical signal which is representative of the desired signal BG, and similarly for the remaining four PFCs. Operation of the remaining filters, photodiodes, and operational amplifiers 20-26 is the same.

A first capacitor means 32 and switch 52 are connected across operational amplifier 12. Switch 52 is opened, and capacitor 32 begins to charge up. After a set time, the capacitor voltage is amplified by amplifier 80, then converted to a number by analog-to-digital (A/D) converter 90 and stored in random-access-memory (RAM) 100. Integers are similarly generated for the other seven input channels.

Microprocessor 110 pairs the eight signals from the RAM and the eight coefficients from the read-only-memory (ROM), corresponding to the lamplight characteristic called for, makes the multiplications, sums the products and outputs the result.

Following is a component-chart of the essential meter components:
Filter F1: UV Corning #9863 filter glass.
Filter F2: V Kodak Wratten 36 and 47A plus Roscoe 99.
Filter F3: BV Kodak Wratten 2E and 48A.
Filter F4: BG Kodak Wratten 75.
Filter F5: G Kodak Wratten 74.
Filter F6: Y Kodak Wratten 22 and 73.
Filter F7: OR Kodak Wratten 25 and 31 and 66.
Filter F8: DR Kodak Wratten 80A and 92.
Photodiode D1: Hamamatsu G1126.
Photodiodes D2-D8: Centronic BP-5BC.
Operational amplifiers 12-26: Texas Instrument TL064ACN.
Capacitors 32: 0.1 microfarad.
Switches 52: RCA CD4066.
Amplifier 80: Burr-Brown PGA 100BG.
A/D converter 90: National Semiconductor ADC0808.
Microprocessor 110: Motorola 6805E.
Random access memory 100: Hitachi HM6116.
Read-only memory 120: Amer. Micro Devices 2716.

THE MEASURED CHARACTERISTICS—A GENERAL DISCUSSION

The present apparatus has been designed to measure twenty different characteristics of lamplight, many of which are internationally accepted, but some of which are yet to be agreed upon by all experts in the field. For this reason, a detailed discussion of the lamplight characteristics to be measured appears indicated. Undoubtedly, lamplight characteristics other than those presently measured will be added in the future.

As indicated, the present method and apparatus, in a preferred embodiment, has eight eyes, i.e. eight independent inputs. The eight eyes are sensitive to different colors of light; that is, to different parts of the spectrum. The eight eyes respond to: Ultraviolet, violet, blue violet, blue-green, green, yellow, orange-red, and deep-red, respectively.

This means that the IQ meter can measure eight dimensions of lamplight. Most of us cannot imagine what it means to measure, and then visualize, more than three dimensions—length, width and height of an object, or hue, saturation, and brightness of a light. So the remaining five dimensions sensed by the IQ meter remain outside our ability to visualize. However, what we can do is relate those eight dimensions of lamplight to some complex characteristic of the lamplight, for example BRIGHTNESS, which we can understand. This is the second step—the computation step—performed by the meter.

EXAMPLE
COLOR-ATTRACTIVENESS

1. Computation.

It is important to grasp the fact that most types of lamplight are mixtures of colored lights; in fact, most lamplights are mixtures of lights of all colors, even though the lamplight usually appears white to the eye. It is the composition of the lamplight, the varying amounts of these colored lights which make up the lamplight, which is responsible for the great differences we note from one lamplight to another.

Immerse the meter in a certain lamplight we will call "lamplight A". Touch the read-button. It "looks at" lamplight A for a few seconds. During this time, each eye of the meter accumulates an electric charge, proportional to the intensity of that segment of the lamplight to which that particular eye is sensitive. For example, the green-sensitive eye accumulates a charge proportional to the amount of green light present in lamplight A, and similarly for the other seven eyes. The electronics in the meter convert the eight electric charges to eight proportional numbers. Suppose the resulting eight numbers, accumulated by the eight eyes, and characteristic of a certain intensity of lamplight A, are:

$$\frac{UV}{31} \quad \frac{V}{73} \quad \frac{BV}{122} \quad \frac{BG}{158} \quad \frac{G}{188} \quad \frac{Y}{245} \quad \frac{OR}{221} \quad \frac{DR}{132}$$

(Lamplight A).

The meter automatically commences to make a long, complex calculation of each of the twenty characteristics of that certain intensity of lamplight A. The calculation is guided by the eight numbers 31,73,122,158,188,245,221,132 which it accumulated while looking at lamplight A. In perhaps a second, the twenty calculations are finished, and stored in its memory.

Now touch C1 (Color-Attractiveness) on the keyboard. Out comes the number 613 to the display. A Color-Attractiveness of 613 is reasonably good.

Now repeat the entire process with the meter immersed in a certain intensity of lamplight B, resulting in:

$$\frac{UV}{20} \quad \frac{V}{51} \quad \frac{BV}{102} \quad \frac{BG}{141} \quad \frac{G}{194} \quad \frac{Y}{169} \quad \frac{OR}{251} \quad \frac{DR}{158}$$

(Lamplight B).

This time, each "eye" has accumulated a slightly different number. The green-content (and each of the seven other "contents") of lamplight B is at least a little different from that of lamplight A. All the calculations are redone. Upon touching C1, out comes the number 842, a value of Color-Attractiveness representing a lamplight which is very good indeed.

Figure 2:
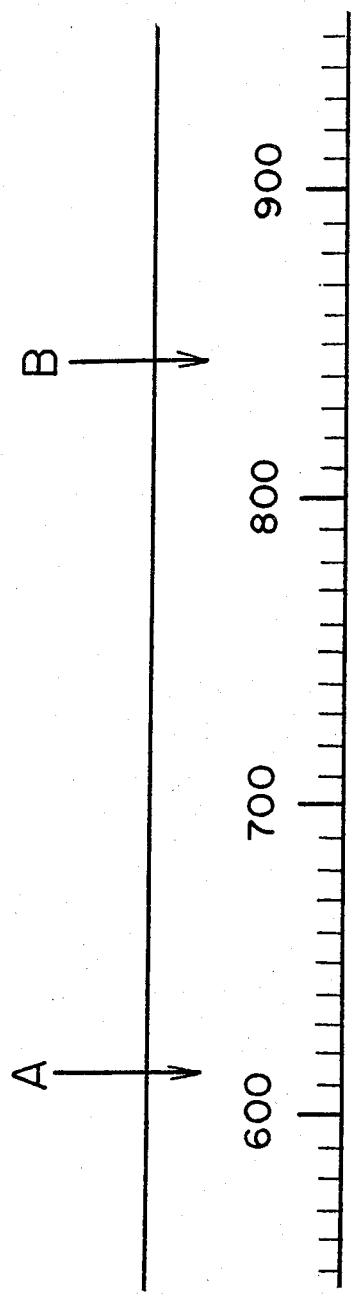
FIG. 2 is a sketch of the "yardstick" representing the scale of one of twenty characteristics of illumination, namely, Color-Attractiveness.

The meter has transformed the eight measured dimensions of the lamplight into a point on a simple scale (yardstick, FIG. 2) of Color-Attractiveness which we can understand. It does this by comparing its eight readings to a data-bank on many other lamplights of widely-varying characteristics, all stored in its memory. It has done this for all twenty lamplight characteristics, only one of which we have as yet called for.

The "Color-Attractiveness" Scale

Let us take for concreteness the scale of color-attractiveness, and examine the means by which it was arrived at. Sixty or seventy real lamps were assembled, including most of the commercial lamp-types on the market today (incandescent, fluorescent, and high-intensity-discharge lamps) and in addition many experimental lamps with properties both considerably superior to, and considerably worse than, those of actual marketed lamps. Five identical enclosures were provided, with identical arrays of familiar colored objects such as fruit, vegetables, meat, bread, butter, well-known examples of commercial packaging, metallic objects. The geometry of the lighting was carefully controlled to be constant despite changes in type of lamp.

Each of the five enclosures was illuminated by a lamp with a different spectral power distribution, i.e. by a different lamp-type. Brightness in each enclosure was adjusted to be approximately the same for all enclosures. All five enclosures were viewed simultaneously by the experienced human observer. The observer was required to rank the color-attractiveness of the arrays of objects each in its particular lamplight, and to assign each enclosure (lamp type) a number from one to ten, the poorest being assigned the number one, and the most attractive coloration the number ten. One set of five lamp-types might be assigned the numbers: 3, 9, 10, 1, 2. Another set might be assigned the numbers: 8, 1, 3, 10, 5. Once the individual observers had made their assignments, two or more observers were asked to rank the five lamplights by consensus.

Next, three of the lamp-types were changed, always leaving two lamps from the previous session, but randomized in position. The observations and ranking were carried out as before, and the process repeated until all lamp-types had been compared in groups of five.

The assessments of the single observers were remarkably alike. Consensus was in most cases easy to agree upon. It was therefore apparent that the "average person" is well-defined, as regards his criteria for assessing attractiveness of coloration of an illuminated scene.

The averaged magnitude estimations were interleaved (the reason for having two lamp-types common to sets of five in successive sessions). The result was a scale in which each lamp-type was assigned a certain rank, and in which the scale-distance between adjacent lamps was not constant; i.e. the scale distance between types ranked 63 and 64 would probably be different from the distance between types ranked 42 and 43. To the worst lamplight was assigned "color-attractiveness=1" and to the best, "color-attractiveness=1000". Most future lamps will undoubtedly fall in the range of color-attractiveness of 1 to 1000. Hopefully a lamp of the future will exceed a value of 1000 (which will introduce no problem, either to the IQ meter or to conceptualization by the user), and also hopefully no commercial lamp will require a negative value. "Color-attractiveness", arrived at in the above manner, fulfills the three criteria: it is numerical, it represents the "average person", and it is completely visually-based.

Other Scales

"Color-scheme-stability" was arrived at in essentially the same manner. Instead of foods, etc., identical arrays of fabrics were used, with the obvious criterion of degree of upset of the color-scheme with change in lamp-type.

The scale of "Brightness Units" was found in a conceptually somewhat simpler manner. Only two adjacent, identically furnished enclosures, each with a different lamp-type, were used. Since neither quality nor trueness nor preferredness of coloration was the criterion, but rather the perceived brightness of the scene, the nature of the colored objects in the identical scenes was presumed to be irrelevant. The footcandle-level in both enclosures was initially set to 100. Then the brighter enclosure was dimmed until the perceived brightness in each enclosure was pronounced the same. At that point, the footcandle levels were again read and their ratio taken. For each enclosure (lamp-type) a relative perceived-brightness-per-footcandle value (B/FC) was thus obtained. For the yellow illumination of the "Gold" fluorescent lamp, perceived-brightness-per-footcandle was arbitrarily set at "1.00", and the values for all other lamp-types related to that. As examples, the B/FC values for a few familiar commercial lamplights are given in the table below:

| Lamplight | B/FC |
|---|---|
| Warm White fluorescent | 0.9 |
| Cool White fluorescent | 1.0 |
| Daylight fluorescent | 1.1 |
| North light | 1.4 |

Knowing the B/FC values for all of the lamps, one has only to multiply the measured footcandle values by the appropriate value of B/FC to obtain the correct number of "Brightness Units".

The scale of "Visibility Units" was found in the above manner. However, the brighter enclosure was dimmed not to equal brightness, but to equal "visibility". This criterion is a little harder to define than "brightness". It involves the ability to see the elements of a scene clearly. In many cases, for example, the observer dimmed the one enclosure much farther than he would have, had the criterion been "equal brightness". It points up the fact that "brightness", although a more useful unit than "footcandle level" with which to correlate the ability to see well, gives place to the concept of "visibility".

In a boat on a lake on a calm morning, in a thin, sunlit fog, there may be a great deal of brightness, but one is able to see very little: the "visibility" is low.

In everyday human visual experience, it is necessary to distinguish between, and to do the best possible to measure, "brightness" and "visibility".

In the experiments being described, consensus was arrived at in the matter of equality of visibility, although considerably more roughly than in the case of color-attractiveness. Then, a value of visibility-units-per-footcandle was arrived at for each lamp. As before, for the yellow illumination of the "Gold" fluorescent lamp, visibility-per-footcandle was arbitrarily set at "1.00", and the values for all other lamp-types related to that.

Knowing the V/FC values for all of the lamps, one has only to multiply the measured footcandle values by the appropriate value of V/FC to obtain the correct number of "Visibility Units".

These new visual scales are the subjects of continuing research, for they must be determined with increasing precision. Nevertheless, already their validity far surpasses anything heretofore available for the quantitative assessment of lighting quality.

The Twenty Measured Characteristics of Lamplight

1. The Footcandle.

The footcandle is an illuminance of one lumen per square foot incident upon a surface. One manner of defining the "lumen": In one watt of pure yellow-green light of wavelength 555 nm, there are 683 lumens. If that one watt of light were to fall on one square foot of white paper, the resulting 683 footcandles would appear bright yellow green to the normal observer (average person).

The IQ meter reads footcandles as does the footcandle meter, but with the increased accuracy deriving from its eight eyes, rather than from the footcandle meter's one eye. Number of lumens=number of watts×683 (lumens per watt for the spectral color 555 nm)×the luminous efficiency of the light. Luminous efficiency is luminous flux/radiant flux. Radiant flux is the integral of the spectral power distribution, in watts of light incident per unit area; luminous flux is the integral of the spectral power distribution weighted by the photopic spectral luminous efficiency function V-lambda, variously called the 'luminosity function', the 'visibility curve', etc. The footcandle meter 'has one eye'; its sensitivity is defined by the photopic spectral luminous efficiency function V-lambda. Footlambert: an equivalent footcandle; one lumen per square foot will be reflected from a perfectly white, perfectly diffusing surface upon which one footcandle (one lumen per square foot) is falling. A surface is said to have a luminance of one footlambert if it is emitting one lumen per square foot.

It is important to distinguish carefully between perceived-brightness and either the lumen, the footcandle, or the footlambert. None of these latter units can substitute for what is normally called "brightness". The footcandle does not correlate well to what people see as 'bright'.

To compute footcandle level, inputs from the meter's eight eyes are properly weighted according to the prescribed photopic relative luminous efficiency function V-lambda, and the footcandle level incident on the detector-head is accurately computed.

2. The Brightness Unit.

The brightness unit is contrasted to the footcandle by visual experiment. Many types of experiments require a trained observer with normal vision to adjust two observed lights, or illuminated spaces, so that their brightness is perceived to be the same.

A list of thirty-three published references, documenting the general problem of visual determination of the relative brightnesses of different lights, will be found in "Brightness Meter", Journal of the Illuminating Engineering Society, October 1980.

Once the observer pronounces the lights to be equally bright, the footcandle (or footlambert) level is then measured, and the ratio B/L of perceived brightness per unit of illuminance, or luminance, is determined. Over the years, thousands of data of this type have been amassed; it has been found that (1) observers with normal color vision agree adequately well on B/L for a given light, and (2) B/L varies a great deal among lights of different color or at least of different spectral power distribution.

For our purposes, in relation to the meter, 'normal' yellow light, such as incandescence through a yellow filter (yellow traffic light) is taken to have a brightness-unit-per-footcandle or brightness-unit-per-footlambert ratio of 1.00.

Many published results on a large number of illuminants of varying spectral power distribution contribute to the function, stored in the IQ meter's memory, by which brightness units are computed from the eight inputs. Others have measured B/L for several hundred colored lights; they showed that pure blue light has about ten times the brightness units per footcandle as does normal yellow light, and pure green light and pure red light have about twice the brightness units per footcandle as does yellow light. More interesting still, light of the same color may have quite different brightness-per-lumen depending upon its spectral power distribution; this is a natural consequence of the three independent, and spectrally different, inputs of the normal human visual system.

3. Brightness-Per-Footcandle.

Brightness-per-footcandle was determined, as described above, for a large number of types of lamplight. It is simply the quotient of computed brightness units and computed footcandles, for any illumination sampled and computed by the meter. Example: For 5000° K. filtered incandescence, brightness-per-footcandle will appear on the meter readout as 1.3; that is, such illumination provides 30% more brightness units than it does footcandles. Alternatively stated, 100 footcandles of that illluminant provide the same perceived brightness as do 130 footcandles of normal yellow light (for which brightness-per-footcandle=1.00).

4. The Visibility Unit.

The visibility unit is also compared to the footcandle by visual experiment in exactly the same manner as is the brightness unit. Here, rather than setting to equal perceived brightness, the observer adjusts the light level in two illuminated spaces so that he can see equally well, equally clearly. As mentioned above, two visual characteristics of illumination are not at all the same. A room can seem full of light, and yet one may not be able to see particularly well. Visual experiments on visibility units are ongoing; results collected so far are incorporated in the visibility function, stored in the meter's memory, by which visibility units are computed from the eight inputs.

5. Visibility-Per-Footcandle.

Visibility-per-footcandle was determined, as described above, for a large number of types of lamplight. It is the quotient of computed visibility units and computed footcandles. Example: For the Cool White Deluxe fluorescent lamp, visibility-per-footcandle will appear on the IQ meter readout as 2.4; that is, such illumination provides 2.4 times as many visibility units as it does footcandles. Alternatively stated, 10 footcandles of Cool White Deluxe illumination will provide the same visibility as will 24 footcandles of yellow light such as that from the 'gold' fluorescent lamp.

6,7,8. Visible Milliwatts Per Square Meter, Violet Milliwatts Per Square Meter, Ultraviolet Milliwatts Per Square Meter.

The approximate wavelength bands which are scanned by the meter for visible, violet, and ultraviolet content of the illumination are shown in FIG. 1. For example, 100 footcandles of light from an incandescent lamp carries with it about 3.5 visible watts per square meter, 110 milliwatts of violet light, and about 20 milliwatts per square meter of ultraviolet, if the light-source is an unshielded quartz-tungsten incandescent lamp.

Common household bulbs will emit a smaller proportion of ultraviolet radiation.

Lamplight may contain radiation outside the range of wavelength covered by the meter. For example, lamplight from the incandescent lamp contains much infrared radiation, at wavelengths longer than the "deep-red". Such radiation plays no part in the visual processes of interest here, and therefore the meter has not been equipped to detect it.

9,10,11. Visible Microwatts Per Lumen, Violet Microwatts Per Lumen, Ultraviolet Microwatts Per Lumen.

In a certain lamplight, once the visible watts per square meter and the footcandle level have been measured, the quotient (times a constant) yields the visible microwatts per lumen; similarly for violet and ultraviolet content of a lumen of that lamplight. For the museum conservator, for example, the measurement of ultraviolet microwatts per lumen is considered relevant to the desired balance between the opposing requirements of (1) visibility to the observer of a precious article, and (2) its decomposition by incident light. Example: Standard Cool White fluorescent light contains 60 microwatts of ultraviolet per lumen, while clear mercury HID contains 680 and one variety of 5000° K. filtered incandescence only 11.

12,13. Brightness Units Per UV Milliwatt Per Square Meter, Visibility Units Per UV Milliwatt Per Square Meter.

In a certain lamplight, once the brightness units and the ultraviolet milliwatts per square meter have been measured, the quotient yields the number of brightness units per ultraviolet milliwatt per square meter. These are also units of intense interest to the museum curator, as are visibility units per ultraviolet milliwatt per square meter of museum area, for example. Examples: clear mercury HID supplies 0.3 visibility units per ultraviolet milliwatt per square meter, Cool White fluorescent 1.2, and the 5000° K. filtered tungsten incandescent light supplies 2.1 units.

14. CHROMATICITY.

Chromaticity x and y are coordinates on a "color map" (FIG. 3) called the 1931 CIE x,y chromaticity diagram. Coordinates x and y are computed by the IQ meter for the incident lamplight. As examples: Lamplight from the ordinary incandescent bulb has approximately the chromaticity $x=0.448$ and $y=0.408$. That of the standard Cool White fluorescent lamp is about $x=0.367$, $y=0.384$. That of the Gold fluorescent lamp is about $x=0.517$, $y=0.479$. The chromaticity of a lamplight will not actually indicate its apparent color; recall that an incandescent lamp inside a home, but observed from outside in average daylight, appears very yellow; but after dark from inside the home the same lamp appears quite white. Two types of illumination may of course have the same chromaticity but be very different in their other characteristics. For example, average daylight (6500° K.) and the standard Daylight fluorescent lamp both have a chromaticity of about $x=0.315$, $y=0.335$, in the 'white' region of the diagram; their color-rendering characteristics are however quite different.

15. Color-Temperature.

"Color-temperature" is a convenient way of specifying the color of certain familiar and useful lights. The white light from an overcast sky is one of these; it is one of a unique series of natural lights, characteristic of incandescent glowing bodies like the sun. At one end of this series of lights is the glow from a red-hot poker in a blacksmith's shop. "Red-hot" corresponds to a temperature of about 1000° Kelvins (1300 degrees Fahrenheit); the reddish color is characteristic of an incandescent body at 1000° Kelvins. The incandescent tungsten filament in the household lightbulb, near 2800° Kelvins, glows with a yellowish light. Sunlight has the color of a glowing body at about 5000° Kelvins, and blue sky has the color of a glowing body at some very high temperature, say 100,000° Kelvins. Each temperature in Kelvins has associated with it a color: red, yellow, white, blue-white, as temperature increases. So we have a scale of "color temperatures"; the color temperature of the sun is about 5000° K. because the color of its light when it reaches us is that of an incandescent body at 5000° K. The various phases of daylight are all members of the series of "natural" lights, to each of which is associated a color temperature. Light from a yellow sunset may have a color temperature of 2000° K., from a warm-looking cloud in the sunlight 4200° K., from an overcast sky 6500° K. Note that there is nothing in the "warm-looking cloud" that is anywhere near 4200° K. in actual temperature; it just shares the color of an incandescent body which is glowing at that temperature. Light from the commonest of fluorescent lamps has a 4200° K. color temperature, but the lamp is hardly warm; light from the glowing embers in a fireplace has a 1000°-2000° K. color temperature, and in that case the embers are really that hot.

Figure 3:
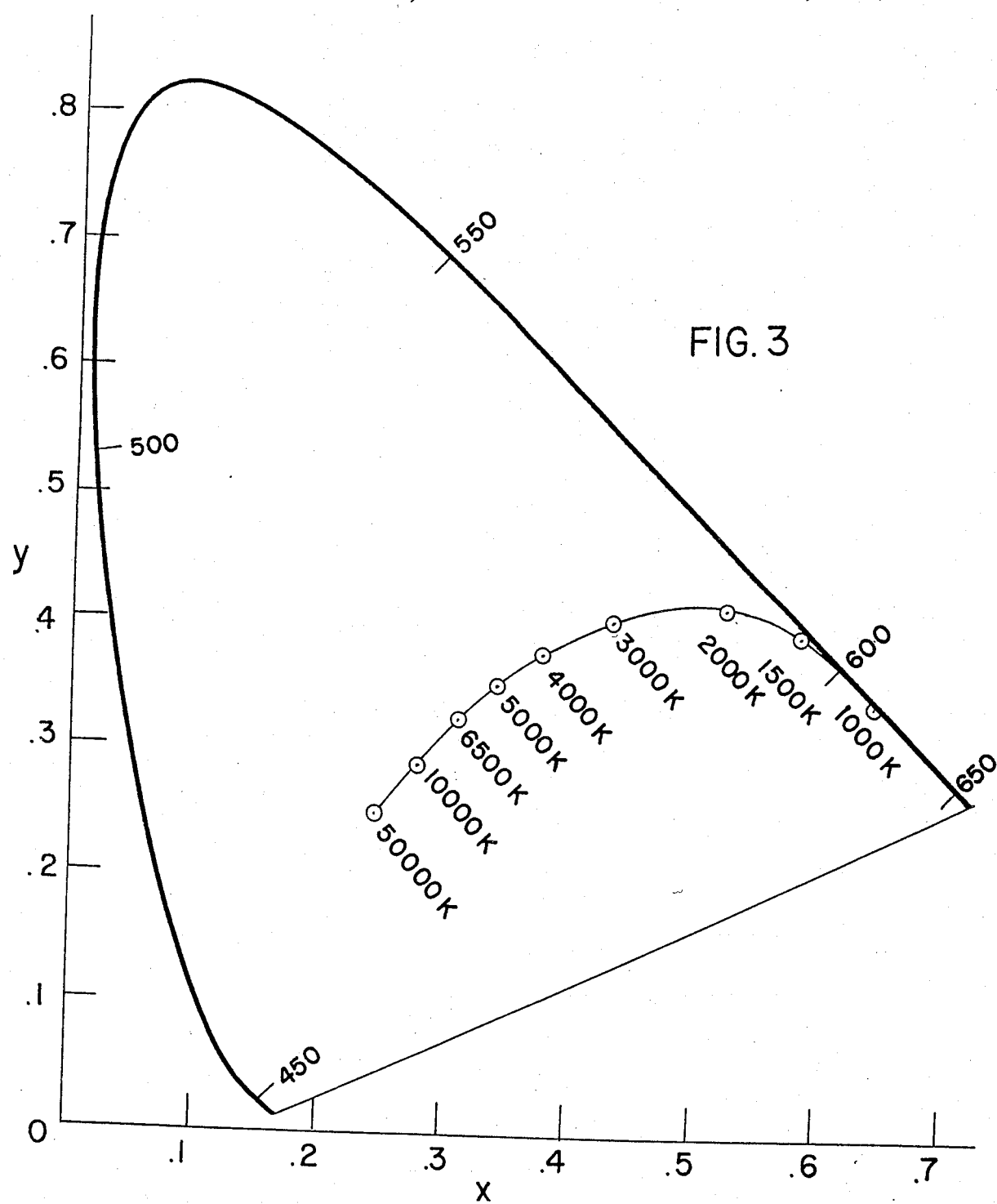
FIG. 3 is the 1931 CIE x,y color-diagram.
Figure 4:
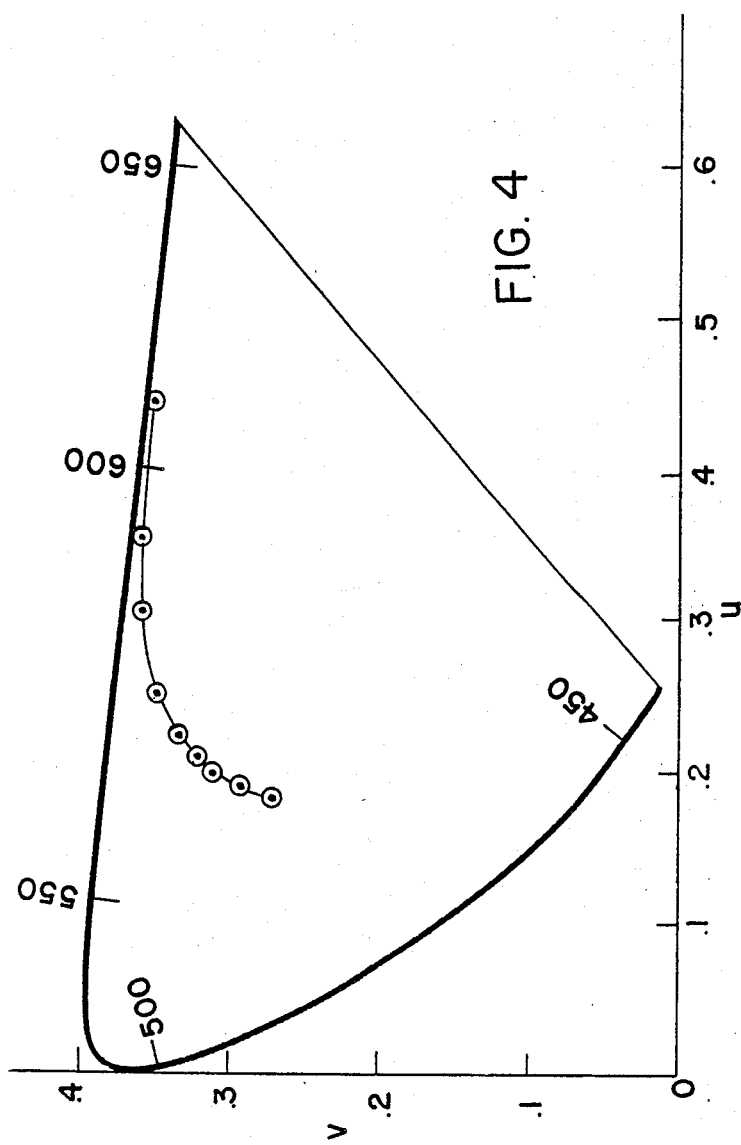
FIG. 4 is the 1960 CIE u,v color-diagram.

The curve within the color diagrams of FIGS. 3 and 4 is the locus of chromaticities of the unique series of natural lights, which include phases of daylight, and light from incandescent bodies. On this curve lie the chromaticities (colors) with each of which is associated a color-temperature in Kelvins.

What the IQ meter actually calculates, as defined for the 1960 CIE u,v color diagram (FIG. 4), is known as the "correlated color temperature" of the lamplight. Many lamplights are either a bit greener or a bit more purple than the "natural" lights of the preceding paragraph, and so do not really have a "color temperature". Because the unit is a useful one, although very approximate, correlated color temperature is commonly specified for lamplights. It is the color closest to the color of one of the natural lights. Because the definition of "closest to" depends upon the particular color-diagram used (and there are many in use for different purposes), the specification of "correlated color temperature" is, for many types of lamplight, rather sloppy. Choice of another 'official' color diagram (there are difficult problems with the present choice—or with any choice—of color diagram) is a possibility which is currently being considered. A change would make significant shifts in the assigned correlated color temperature of any lamplight differing from the natural series. Correlated color temperature of the sodium lamp is about 2000° K.; the Warm White fluorescent lamp is about 3000° K.; 'Cool White' about 4200° K.; sunlight about 5000° K.; overcast sky about 6500° K.

16. Color-Rendering Index.

Figure 5:
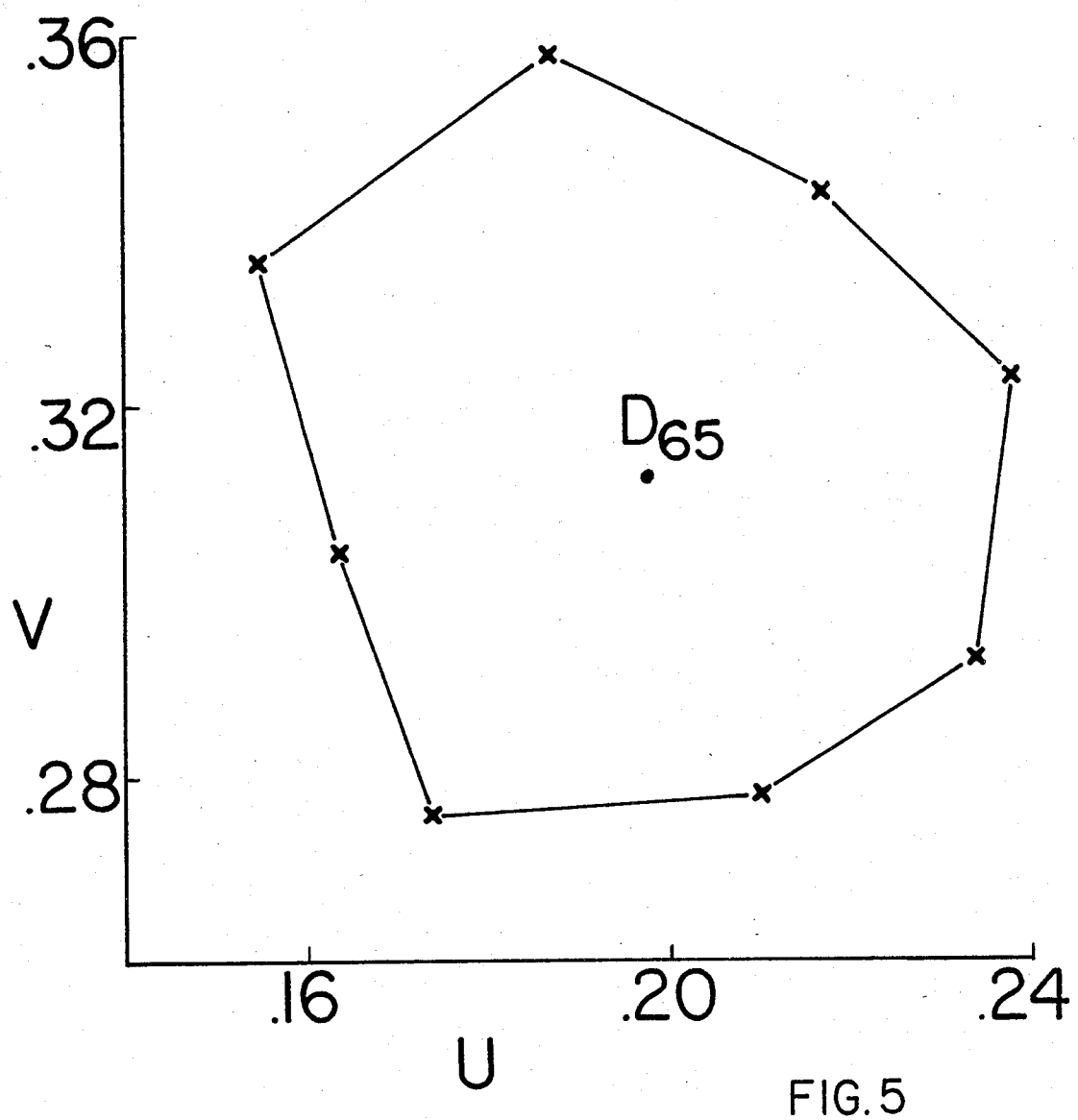
FIG. 5 is an enlarged area of the 1960 CIE u,v color-diagram.

Color-rendering index is a measure of the similarity of color-rendering of a lamplight to that of a reference phase of daylight closest to it in correlated color temperature. The CIE defines eight test-colors by their spectral reflectance curves. The eight chromaticities of these test-colors, as rendered by the lamplight, are plotted in the u,v color diagram (FIG. 5). The eight chromaticities as rendered by the proper reference illuminant (which we can take as a phase of daylight closest in color to that of the illuminant) are also plotted. If the rendered chromaticities by reference and test illuminants exactly coincide, CRI=100. If they do not, i.e. if some or all of the test-colors are shifted by the test illuminant, the average color-shift is computed, and the CRI reduced. CRI=50 for the standard Warm White fluorescent lamp (rather poor color-rendering), and can even go negative for illuminants like low-pressure sodium. Two of the main problems with CRI are: (1) If CRI is appreciably less than 100, there is no way of guessing whether coloration is pleasant and acceptable, or unpleasant and unacceptable. As one example, CRI=60 for both the metal-halide HID lamp and for the prime-color HID lamp; the colors of fruit, vegetables, complexions, etc., appear pale and washed-out under the former lamp, and colorful and vibrant under the latter lamp. (2) CRI of all reference illuminants is, by definition, 100; but color-rendering by blue sky is very different from that by the light from a yellow sunset, although for both CRI=100, and both are prescribed reference illuminants.

17. Color-Gamut.

Color-gamut is simply the area on the u,v color diagram enclosed by the eight-sided figure (FIG. 5) formed by the chromaticities of the eight test-objects as rendered by the test illuminant. Normalized to 100 for average 6500° K. daylight. The larger the gamut, the more saturated all colors will tend to appear. CG=60 for the standard Cool White fluorescent lamp, 100 (as large as that for daylight) for the Cool White prime-color fluorescent lamp. See "Color-Discrimination Index", Journal of the Optical Society of America, February, 1972.

18. Color-Preference Index.

Computed somewhat similarly to the CRI, except that the target, or ideal, chromaticities of the test-objects are not those as rendered by some reference illuminant, but rather those which the normal observer wishes to see. As prescribed by D. B. Judd of NBS in 1967, based on a collection of results of visual experiments on choice of colors for familiar objects. The computed CPI of an illuminant agrees well with the ranking of that illuminant as to acceptability of the coloration it gives to a scene. For average daylight, CPI=100. Pure prime-color illumination reaches a CPI of 120 or so. For deluxe fluorescent lamps CPI ranges 80–100. For standard fluorescent lamps, CPI is 50–70; for clear mercury HID, about zero; lower for the sodium lamps. See Deane B. Judd, "A Flattery Index for Artificial Illuminants", Illuminating Engineering, Volume 62, page 593, October, 1967; and "Customer Acceptance of the Color-Rendering of Illumination", Lighting Design and Application, March, 1982.

19. Color-Attractiveness.

A visual scale arrived at by side by-side comparison of coloration given to identical arrays of familiar objects by sixty widely varying illuminants. The illuminants were compared four or five at a time, and the results interleaved to form a continuous scale running from one to about 1000 arbitrary units. Examples: For the incandescent lamp, CA=823; Cool White Deluxe fluorescent 680; standard Cool White 430; clear mercury HID 60.

20. Color-Scheme Stability.

The interior designer chooses his color-scheme in excellent quality illumination. He then hopes his color scheme survives a change of lamplight. A visual scale was arrived at in the same way as for color-attractiveness, using color-schemes of fabrics as test-arrays. Visual experiments on color-scheme stability are ongoing; results collected so far are incorporated in the color-scheme-stability function, stored in the IQ meter's memory, by which CSS units are computed from the eight inputs. CSS=700 for the incandescent lamp and 450 for the standard Cool White fluorescent lamp. See "The Design of Safety Colors", Journal of the Illuminating Engineering Society of North America, January, 1977, for related discussion.

I claim:

1. The method of measuring any of a large number of predetermined characteristics of lamplight, which method comprises:

extracting from the lamplight to be measured, seven narrow radiation bands respectively peaked in the violet, blue-violet, blue-green, green, yellow, orange-red, and deep-red;

for each predetermined lamplight characteristic to be measured, assigning a weighting coefficient to each of said narrow bands, said weighting coefficients having been previously determined by separately measuring the contributions of each of similar narrow bands to values of said predetermined lamplight characteristics which are already known for at least seven different lamplights of highly disparate emissions; and multiplying the measured power in each of said narrow bands extracted from the lamplight being measured and the previously assigned band-weighting coefficients to provide a plurality of values the summation of which is an accurate representation of the predetermined lamplight characteristic desired to be measured.

2. The method as specified in claim 1, wherein there is also extracted from the lamplight to be measured a relatively broad band peaked in the ultraviolet.

3. The method as specified in claim 1, wherein said predetermined lamplight characteristic to be measured is one of footcandles, brightness units, visibility units, visible milliwatts per square meter and violet milliwatts per square meter.

4. The method as specified in claim 1, wherein a relative predetermined lamplight characteristic which does not vary with the intensity of the lamplight being measured is derived by dividing the summation of said plurality of values as obtained for a predetermined lamplight characteristic by the summation of the measured powers in each of said bands to provide a value which is an accurate representation of said relative predetermined lamplight characteristic.

5. The method as specified in claim 4, wherein said relative predetermined lamplight characteristic to be measured is one of correlated-color-temperature, color-attractiveness, color-gamut, color-rendering-index, color-scheme-stability, chromaticity x,y, and color-preference index.

6. The method of determining accurate weighting coefficients for each of seven narrow radiation bands respectively peaked in the violet, blue-violet, blue-green, yellow, orange-red, and deep-red for use in accurately measuring a predetermined characteristic of lamplight, which method comprises:

separately measuring the contributions of each of similar radiation bands to values of said predetermined lamplight characteristic which are already known for at least seven different lamplights of highly disparate emissions to provide at least seven simultaneous equations which have as unknowns the seven coefficients to be determined; and solving said simultaneous equations for said coefficients to provide known coefficient values for each of said seven radiation bands; whereby when measuring any lamplight for said predetermined characteristic, the measured power in each of said narrow bands can be extracted from the lamplight being measured and multiplied by the determined band-weighting coefficients to provide a plurality of values the summation of which is an accurate representation of said predetermined lamplight characteristic.

7. Apparatus for measuring any of a large number of predetermined characteristics of lamplight, said apparatus comprising:

means for extracting from the lamplight to be measured, seven narrow radiation bands respectively peaked in the violet, blue-violet, blue-green, green, yellow, orange-red, and deep red;

means for assigning a weighting coefficient to each of said narrow bands, said weighting coefficients having been previously determined by measuring means for separately measuring the contributions of each of similar narrow bands to values of said predetermined lamplight characteristics being measured which are already known for at least seven different lamplights of highly disparate emissions in order to generate at least seven simultaneous equations which can be separately solved, and which have as unknowns the seven band-weighting coefficients to be assigned, and read-only-memory means for storing said determined band-weighting coefficients after they have been determined by outside computation; and multiplying and summation and display means for multiplying the measured power in each of said narrow bands extracted from the lamplight being measured and the previously assigned band-weighting coefficients to provide a plurality of values the summation of which is displayed as a number which is an accurate representation of the predetermined lamplight characteristic being measured.

8. The apparatus as specified in claim 7, wherein said predetermined lamplight characteristic to be measured is one of footcandles, brightness units, visibility units, visible milliwatts per square meter and violet milliwatts per square meter.

9. The apparatus as specified in claim 7, wherein signal value dividing means operates to divide said summation of said plurality of values as obtained for a predetermined lamplight characteristic by the summation of the measured powers in each of said bands to provide a quotient value, and said display means operates to display said quotient value as a number which is an accurate representation of a relative predetermined lamplight characteristic which does not vary with the intensity of the lamplight being measured.

10. The apparatus as specified in claim 9, wherein said relative predetermined lamplight characteristic is one of correlated-color-temperature, color-attractiveness, color-gamut, color-rendering-index, color-scheme-stability, chromaticity x,y, color preference index.

11. The apparatus as specified in claim 8, wherein additional extracting means is provided for extracting from the lamplight to be measured a radiation band substantially confined to the ultraviolet, means for assigning a weighting coefficient to said extracted ultraviolet band, said weighting coefficient having been previously determined by separate measuring means for converting the power in said ultraviolet band to a weighting coefficient which is representative of ultraviolet intensity, and said ultraviolet band weighting coefficient is stored in said read-only-memory means, and means for multiplying measured ultraviolet power in the lamplight being measured times said stored ultraviolet band-weighting coefficient to provide a numerical display which is an accurate representation of a predetermined lamplight characteristic which includes ultraviolet intensity as a part thereof.

12. The apparatus as specified in claim 11, wherein said relative predetermined lamplight characteristic is one of visibility per ultraviolet milliwatt per square meter, ultraviolet microwatts per lumen, brightness per ultraviolet milliwatt per square meter, and ultraviolet millliwatts per square meter.

13. Apparatus for measuring any of a large number of predetermined characteristics of lamplight, said apparatus comprising:

means for extracting from the lamplight to be measured, seven narrow radiation bands respectively peaked in the violet, blue-violet, blue-green, green, yellow, orange-red and deep red;

means for assigning to each of said narrow bands a weighting coefficient which has previously been determined for the specific lamplight characteristic being measured;

means for converting the power in each of said extracted bands into a signal which is representative of the power in said extracted bands; and multiplying and combining and display means for multiplying the signals corresponding to the measured power in each of said extracted bands and the corresponding assigned band-weighting coefficients and combining them according to a predetermined algorithm to provide a value which is displayed as a number which is an accurate representation of the predetermined lamplight characteristic being measured.

14. The apparatus as specified in claim 13, wherein there is also extracted from the lamplight to be measured a relatively broad band peaked in the ultraviolet, means for assigning a weighting coefficient to said ultraviolet power, means for converting the power in said extracted ultraviolet radiation into a signal which is representative of the power in said extracted ultraviolet radiation, and means for multiplying the signal corresponding to said power in said extracted ultraviolet radiation and said weighting coefficient for said ultraviolet radiation to provide a numerical value which is an accurate representation of the power of the extracted ultraviolet radiation.

15. The method of measuring any of a large number of predetermined characteristics of lamplight, which method comprises:

extracting from the lamplight to be measured, seven narrow radiation bands respectively peaked in the violet, blue-violet, blue-green, green, yellow, orange-red, and deep-red;

for each predetermined lamplight characteristic to be measured, assigning a weighting coefficient to each of said narrow bands, said weighting coefficients having been previously determined by separately measuring the contributions of each of similar narrow bands to values of said predetermined lamplight characteristics which are already known for at least seven different lamplights of highly disparate emissions; and multiplying the measured power in each of said narrow bands extracted from the lamplight being measured and the previously asssigned band weighting coefficients to provide a plurality of values which are combined in accordance with a predetermined algorithm the result of which is an accurate representation of the predetermined lamplight characteristic being measured.

16. The method as specified in claim 15, wherein there is also extracted from the lamplight to be measured a relatively broad band peaked in the ultraviolet.

* * * * *